(12) United States Patent
Tang

(10) Patent No.: US 11,356,929 B2
(45) Date of Patent: Jun. 7, 2022

(54) INFORMATION TRANSMISSION METHOD AND DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 64 days.

(21) Appl. No.: 17/037,416

(22) Filed: Sep. 29, 2020

(65) Prior Publication Data

US 2021/0014773 A1    Jan. 14, 2021

Related U.S. Application Data

(63) Continuation of application No. PCT/CN2018/081234, filed on Mar. 30, 2018.

(51) Int. Cl.
  *H04W 48/10* (2009.01)
  *H04W 48/12* (2009.01)
  *H04W 56/00* (2009.01)
  *H04W 72/00* (2009.01)

(52) U.S. Cl.
  CPC .......... *H04W 48/10* (2013.01); *H04W 48/12* (2013.01); *H04W 56/001* (2013.01); *H04W 72/005* (2013.01)

(58) Field of Classification Search
  None
  See application file for complete search history.

(56) References Cited

U.S. PATENT DOCUMENTS

| 2017/0111886 A1 | 4/2017 | Kim et al. |
| 2017/0295552 A1 | 10/2017 | Patel et al. |
| 2018/0083688 A1 | 3/2018 | Moon et al. |
| 2020/0413359 A1* | 12/2020 | Li .................. H04L 5/0094 |

FOREIGN PATENT DOCUMENTS

| WO | 2017180395 A1 | 10/2017 |
| WO | 2018030798 A1 | 2/2018 |

OTHER PUBLICATIONS

Written Opinion and its English translation of the International Search Authority in the international application No. PCT/CN2018/081234, dated Dec. 29, 2018.
3GPP TS 38.213 V1 5.1.0(Mar. 2018), Technical Specification Group Radio Access Network, NR, Physical layer procedures for control(Release 15).

(Continued)

*Primary Examiner* — Hong S Cho
(74) *Attorney, Agent, or Firm* — Perkins Coie LLP

(57) ABSTRACT

Provided in embodiments of the present invention are an information transmission method and device and a computer-readable storage medium. The method comprises: receiving information associated with a system message, the information associated with the system message indicating whether a carrier on which a synchronization signal block is located is associated with the system message; and processing system information according to the information associated with the system message.

20 Claims, 3 Drawing Sheets

(56) References Cited

OTHER PUBLICATIONS

CATT: "Remaining details on NR PBCH", 3GPP Draft; R1-1800998 Revision of R1-1800228 PBCH, 3rd Generation Partnership Project (3GPP), Mobile Competence Centre; 650, Route Des Lucioles ; F-06921 Sophia-Anti Polis Cedex; France, vol. RAN WG1, No. Vancouver, Canada Jan. 22, 2018-Jan. 26, 2018, Jan. 19, 2018 (Jan. 19, 2018), XP051385232.
ETRI: "Indication of cell-defining SS/PBCH block in PBCH", 3GPP Draft; R1-1802141 Indication of Cell-Defining SSB in PBCH-Final, 3rd Generation Partnership Project (3GPP), Mobile Competence Centre; 650, Route Des Lucioles ; F-06921 Sophia-Antipolis Cedex; vol. RAN WG1, No. Athens, Greece; Feb. 26, 2018-Mar. 2, 2018, Feb. 17, 2018 (Feb. 17, 2018), XP051397808.
ZTE Corporation et al.: "Consideration on Report CGI measurement", 3GPP Draft; R2-1802024 Consideration on ReportCGI Measurement, 3rd Generation Partnership Project (3GPP), Mobile Compei Ence Centre; 650, Route Des Lucioles; F-06921 Sophia-Antipolis Cedex; France, vol. RAN WG2, No. Athens, Greece; Feb. 26, 2018-Mar. 2, 2018, Feb. 15, 2018 (Feb. 15, 2018), XP051399794, [Feb. 15, 2018] paragraph [0002].
Nokia et al.: "Remaining details on NR-PBCH", 3GPP Draft; R1-1800803, 3rd Generation Partnership Project (3GPP), Mobile Competence Centre; 650, Route Des Lucioles ; F-06921 Sophia-Antipolis Cedex; France, vol. RAN WG1, No. Vancouver, Canada; Jan. 22, 2018-Jan. 26, 2018, Jan. 12, 2018 (Jan. 12, 2018), XP051384438, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018] paragraph [0004].
OPPO: "Initial access for NR unlicensed", 3GPP Draft; R1-1802126 Initial Access for NR Unlicensed, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 15, 2018 (Feb. 15, 2018), XP051396858.
Samsung: "CR to 38.213 capturing the NR ad-hoc 1801 and RAN1#92 meeting agreements", 3GPP Draft; 38213_CR0001_(REL-15)_R1-1803554,3rd Generation Partnership Project (3GPP), Mobile Competence Centre; 650, Route Des Lucioles ; F-06921 Sophia-Antipolis Cedex; France, vol. RAN WG1, No. Athens, Greece; Feb. 26, 2018-Mar. 1, 2018,Mar. 15, 2018 (Mar. 15, 2018), XP051509057.
Supplementary European Search Report in the European application No. 18913081.8, dated Mar. 11, 2021.
International Search Report in the international application No. PCT/CN2018/081234, dated Dec. 29, 2018.
NTT DOCOMO, Inc. "Remaining Issues on NR-PBCH," 3GPP TSG RAN WG1 Meeting AH 1801 R1-1800650, Jan. 26, 2018 (Jan. 26, 2018), sections 1-2.
Notice of Allowance of the European application No. 18913081.8, dated Jan. 20, 2022. 39 pages.
NTT Docomo, Inc. "Remaining issues on NR-PBCH", 3GPP TSG RAN WG1 Meeting #92 R1-1802461, Athens, Greece, Feb. 26-Mar. 2, 2018. 6 pages.

* cited by examiner

INFORMATION TRANSMISSION METHOD AND DEVICE, AND COMPUTER-READABLE STORAGE MEDIUM

CROSS-REFERENCE TO RELATED APPLICATIONS

The present application is a continuation of International Application No. PCT/CN2018/081234 filed on Mar. 30, 2018, the contents of which are hereby incorporated by reference in its entirety.

BACKGROUND

With the development of the communication technology, research on the 5th Generation (5G) mobile communication technology has started. A 5G wireless access is referred to as New Radio (NR).

At present, an NR system is designed for a StandAlone (SA) scenario on a licensed frequency spectrum. In the SA scenario, system information needs to be carried, but for an NR system using an unlicensed spectrum, there are two possible scenarios, i.e., the SA scenario and a Non-Stand-Alone (NSA) scenario. In the NSA scenario, system information carrying the system information is transmitted through the licensed frequency spectrum, thus no system information needs to be carried on a carrier of the unlicensed frequency spectrum. In this case, as the unlicensed frequency spectrum is shared, when a Synchronization Signal Block (SSB) is transmitted on the unlicensed frequency spectrum in both the NSA scenario and the SA scenario at the same time, the SSB transmitted in the NSA scenario does not indicate relevant information of the system information; in this way, far from yielding any result to implement a 5G access, a frequency spectrum search conducted by User Equipment (UE) based on the SSB makes the UE consume more electricity, increases a complexity of information transmission and reduces the UE's access efficiency.

SUMMARY

The embodiments of the disclosure relate to the technical field of mobile communications, and particularly to a method and device for information transmission, and a computer-readable storage medium.

In order to solve the technical problem above, embodiments of the disclosure are intended to provide a method and device for information transmission and a computer-readable storage medium, which can reduce the electricity consumed by UE, and simplify the information transmission and interaction in a 5G NR system, thereby improving the UE's access frequency.

A method for information transmission is provided in the embodiments of the disclosure. The method is applied to the UE and includes: system information association information is received, the system information association information representing whether a carrier on which an SSB is located has an association relationship with system information; and system information is processed according to the system information association information.

A method for information transmission is further provided in the embodiments of the disclosure. The method is applied to a network side device and includes: system information association information is transmitted to UE, the system information association information representing whether a carrier on which an SSB is located has an association relationship with system information.

Provided in the embodiments of the disclosure is UE including a receiving section and a processing section. The receiving section is configured to receive system information association information, the system information association information representing whether a carrier on which an SSB is located has an association relationship with system information. The processing section is configured to process the system information according to the system information association information.

Provided in the embodiments of the disclosure is a network side device including a transmitting section. The transmitting section is configured to transmit system information association information to UE, the system information association information representing whether a carrier on which an SSB is located has an association relationship with system information.

Further provided in the embodiments of the disclosure is UE including a first network interface, a first memory and a first processor. The first network interface is configured to receive and transmit a signal and information during a process of transmitting information to and receiving information from another external network element. The first memory is configured to store computer programs executable by the first processor. The first processor is configured to execute operations of a method for information transmission when the computer programs are executed, the method including: receiving system information association information, the system information association information representing whether a carrier on which an SSB is located has an association relationship with system information; and processing the system information according to the system information association information.

Further provided in the embodiments of the disclosure is a network side device including a second network interface, a second memory and a second processor. The second network interface is configured to receive and transmit a signal and information during a process of transmitting information to and receiving information from another external network element. The second memory is configured to store computer programs executable by the second processor. The second processor is configured to execute operations of a method for information transmission when the computer programs are executed, the method including: transmitting system information association information to UE, the system information association information representing whether a carrier on which an SSB is located has an association relationship with system information.

Provided in the embodiments of the disclosure is a computer-readable storage medium having stored thereon programs for information transmission that, when executed by at least one first processor, cause operations of the UE's method for information transmission to be performed, or when executed by at least one second processor, cause operations of the network side device's method for information transmission to be performed.

DETAILED DESCRIPTION

Implementation of the embodiments of the disclosure will be described in detail in combination with accompanying drawings as follows in order to make characteristics and technical contents of the embodiments of the disclosure understood in more detail. The accompanying drawings are not intended to limit the embodiments of the disclosure but are for reference and illustration only.

In the embodiments of the disclosure, as a frequency band adopted in a 5G NR system is higher than a frequency band adopted in a Long Term Evolution (LTE) system, a path loss in wireless signal transmission becomes greater and a coverage of the wireless signal becomes smaller in the 5G NR system. Therefore, in the 5G system, a beam is formed by a beam-forming technique in a multi-antenna system of a base station to improve a gain of the wireless signal, which can make up for the path loss in the wireless signal transmission.

In the 5G NR system, a public channel and a public signal cover a whole cell through a multi-beam scanning manner so that UE in the cell may receive the public channel and the public signal (such as a synchronization signal associated with system information). Herein, the NR system may be used on a licensed frequency spectrum or an unlicensed frequency spectrum. In the embodiments of the disclosure, the method for information transmission is implemented in a background that the NR system is used on the unlicensed frequency spectrum.

It can be understood that the unlicensed frequency spectrum that the above NR system is applied to may be a frequency spectrum of 2.4 GHz, a frequency spectrum of 5 GHz, a frequency spectrum of 37 GHz or a frequency spectrum of 60 GHz or the like.

When the NR system in the embodiments of the disclosure is applied to the unlicensed frequency spectrum and a network deployment scenario is an SA scenario, the UE can access the network through the unlicensed frequency spectrum.

Figure 1:
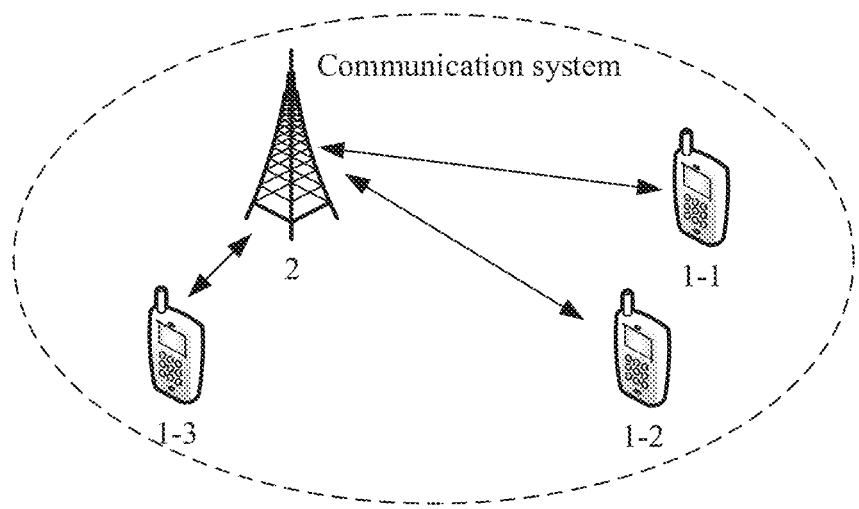
FIG. 1 is a schematic diagram of a communication system provided in an embodiment of the disclosure.

FIG. 1 schematically illustrates a structure of a communication system 1 in an atypical example. The communication system may be composed of UE 1-1, UE 1-2, UE 1-3 and a network side device 2. The UE respectively communicate with the network side device through wireless links marked by bi-directional arrows in FIG. 1. In FIG. 1, the UE in the embodiments of the disclosure may be an access terminal, a user unit, a user station, a mobile station, a remote station, a remote terminal, a mobile device, a user terminal, a terminal, a wireless communication device, a user proxy or a user device. The UE herein may be a terminal device in a 5G network.

The network side device 2 herein may be a device used for communicating with a user device or a network device in an NR network such as a 5G base station (gNB).

In the embodiments of the disclosure, the network side device provides a service to a cell and the user device communicates with the network side device through a transmission resource used by the cell such as a frequency-domain resource (a frequency-spectrum resource). The cell may be a cell corresponding to the network side device such as a base station. The cell may belong to a macro base station or a base station corresponding to a small cell. The small cell herein may include a metro cell, a micro cell, a pico cell, a femto cell or the like. The small cell is characterized by a small coverage and a low transmitting power, and is thus suitable for providing a high-rate data transmission service.

The following embodiments are put forward based on what are described above.

First Embodiment

Figure 2:
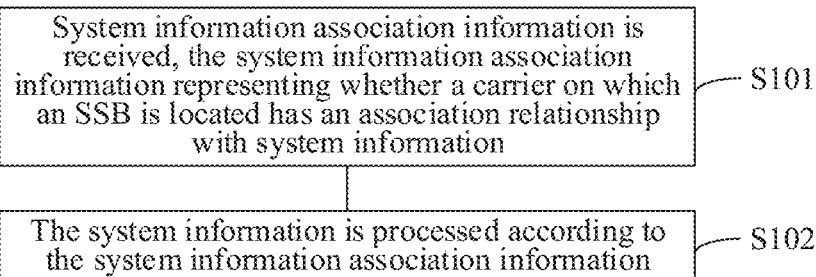
FIG. 2 is a schematic flowchart of a method for information transmission provided in an embodiment of the disclosure.

Embodiments of the disclosure provide a method for information transmission, which applied to a UE side. As illustrated in FIG. 2, the method may include operations S101 and S102.

In operation S101, system information association information is received, the system information association information representing whether a carrier on which an SSB is located has an association relationship with system information.

In the embodiment of the disclosure, the network side device may transmit indication information (i.e., system information association information) representing whether a current carrier on which a current SSB is located is associated with the system information at a current time. When receiving the system information association information, the UE may know whether there is information associated with system information (in the system information) on the carrier on which the received SSB is currently located.

It should be noted that in the embodiment of the disclosure the UE communicates with the network side device through a public signal (such as a Synchronization Signal (SS)). When performing signal transmission implemented by an NR system on an unlicensed frequency spectrum, the UE may obtain the system information in the system information to access a network by receiving the SSB from the network side device.

Figure 3:
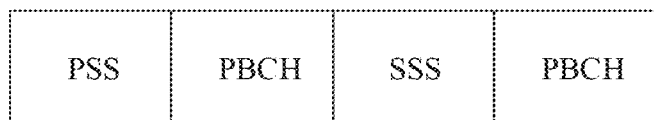
FIG. 3 is a schematic structural diagram of an SSB provided in an embodiment of the disclosure.

Specifically, in the 5G NR system, a multi-beam scanning manner needs to be adopted to make the SS and a broadcast channel to cover a whole cell so that the SS and the broadcast channel can be received by the UE in the cell. An SS burst set is defined for implementing multi-beam transmission of the SS. An SS burst set includes one or more SS bursts, where an SS burst includes one or more SSBs. An SSB is used for carrying an SS of a beam and a broadcast channel. Therefore, an SS burst set may include the SSs of the beams as many as a number of SSBs (also referred to as SSB number) in the cell. An SSB includes a Primary Synchronization Signal (PSS) of a symbol, a Secondary Synchronization Signal (SSS) of a symbol and a New Radio Access Technology-Physical Broadcast Channel (NR-PBCH) of two symbols. A detailed schematic structural diagram is illustrated in FIG. 3. Besides the SS and the PBCH, other public information such as Remaining Minimum System Information (RMSI) and a paging message also needs to be transmitted in the multi-beam scanning manner.

Herein, the SS may be configured for the UE by the network side device and the SSB is used for Radio Resource Management (RRM) and mobile measurement.

It should be noted that in the embodiment of the disclosure, since when information transmission is performed on a carrier of an unlicensed frequency spectrum, the transmission may be in either an SA scenario or an NSA scenario. Thus, the system information association information in the embodiment of the disclosure may also be regarded as information for representing whether the SSB currently received by the UE is transmitted in the SA scenario or the NSA scenario.

In other words, in the embodiment of the disclosure, the system information association information includes: the carrier on which the SSB is located is an SA carrier or an NSA carrier.

It should be noted that when an SA system transmits an SSB on a current carrier, the current carrier on which the SSB is located is indicated as the SA carrier, whereas when an NSA system transmits the SSB on the current carrier, the current carrier on which the SSB is located is indicated as the NSA carrier. Definitions of the SA carrier and the NSA carrier in the embodiment of the disclosure are an indication of a current state of the current SSB at a current time, rather than an indication that a type of the current carrier is invariably "SA" or "NSA". The current carrier is determined by the system that transmits the current SSB and may have different meanings in different application scenarios.

A manner for carrying the system information association information is not limited in the embodiment of the disclosure. Exemplarily, in the embodiment of the disclosure, the system information association information received by the UE is carried by the PBCH. In this way, the UE may obtain the system information association information carried by the PBCH by way of parsing.

It should be noted that in the embodiment of the disclosure, when the UE accesses the NR system, the network side device may transmit the SSB to the UE so that the UE may obtain the system information through the SSB, and then access the network according to the system information.

Specifically, the UE receives a first SSB (the current SSB) and obtains the PBCH carried by the first SSB, and then the UE obtains the system information association information carried by the PBCH.

The manner in which the PBCH carries the system information association information is not limited in the embodiment of the disclosure and may exemplarily be at least one of following manners.

(1) The system information association information is carried through a Physical Downlink Control Channel (PDCCH) resource information field corresponding to the RMSI carried by the PBCH.

(2) The system information association information is carried through a reserved value in a Physical Resource Block (PRB) grid offset information field carried by the PBCH.

In the implementation manner (1), the network side device adopts the PDCCH resource information field corresponding to the RMSI carried by the PBCH to carry the system information association information. Therefore, the UE may obtain the system information association information by parsing the PDCCH resource information field corresponding to the RMSI in the obtained SSB.

It should be noted that as to the RMSI, in the 5G NR system, a common search space used for receiving public control information such as the RMSI needs to be defined for UE during initial access. Therefore, a concept of a Control Resource Set (CORESET) is introduced to define a resource set used for carrying the control information. The UE detects a New Radio-Physical Downlink Control Channel (NR-PDCCH) in the resource set to obtain scheduling information of a New Radio-Physical Downlink Shared Channel (NR-PDSCH) that carries the RMSI. Indication information of the CORESET indicates resource set information of the PDCCH and is carried in a RMSI-PDCCH-Config control information field so that the UE receive the RMSI. Therefore, the indication information of the CORESET is carried in the RMSI-PDCCH-Config information field, namely, the PDCCH resource information field corresponding to the RMSI and specifically indicates information of the Type0-PDCCH common search search space. In the embodiment of the disclosure, the PDCCH resource information field corresponding to the RMSI may be represented as the RMSI-PDCCH-Config information field or be replaced by the indication information of the CORESET indicating or representing the PDCCH information field corresponding to the RMSI, namely the indication information of the Type0-PDCCH common search space.

Specifically, the network side device adopts 8 bits in the RMSI-PDCCH-Config information field to indicate the system information association information. In this way, the UE may obtain the system information association information from the 8 bits of the RMSI-PDCCH-Config information field.

In the implementation manner (2), the network side device adopts the reserved value in the PRB grid offset information field carried by the PBCH to carry the system information association information. Thus, the UE may obtain the system information association information by parsing the reserved value in the PRB grid offset information field in the obtained SSB.

In the embodiment of the disclosure, the reserved value in the PRB grid offset information field carried by the PBCH may be represented as the reserved value in the PRB grid offset information field or $k_{KSB}$.

It should be noted that which reserved value in the PRB grid offset information field the network side device adopts to carry the system information association information may not be limited in the embodiment of the disclosure.

Preferably, the reserved value in the PRB grid offset information field may be 14 or 30 for reasons as follows.

As illustrated in Table 1 and Table 2, only 14 and 30 are unoccupied reserved value for the current $k_{SSB}$. Therefore, it is preferable to select the unoccupied reserved value to indicate new information (the system information association information). In this way, an indication of the system information association information, which is put forward in the embodiment of the disclosure and compatible with an existing indication manner, is added to ensure compatibility in terms of the information transmission manner. Herein, Table 1 and Table 2 show offsets ($N_{GSCN}^{Offset}$) of a parameter "Global Synchronization Channel Number (GSCN)" of "sync raster" corresponding to target SSBs compared with the parameter "GSCN" of "sync raster" corresponding to current SSBs, which are jointly represented by RMSI-PDCCH-Config and k$SSB$ adopted in the prior art. Table 1 is for a Frequency Range (FR) 1 and Table 2 is for an FR 2.

TABLE 1

| $k_{SSB}$ | RMSI-PDCCH-Config | $N_{GSCN}^{Offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

TABLE 2

| $k_{SSB}$ | RMSI-PDCCH-Config | $N_{GSCN}^{Offset}$ |
|---|---|---|
| 12 | 0, 1, . . . , 255 | 1, 2, . . . , 256 |
| 13 | 0, 1, . . . , 255 | −1, −2, . . . , −256 |
| 14 | 0, 1, . . . , 255 | Reserved, Reserved, . . . , Reserved |

It should be noted that both of the two implementation manners (1) and (2) may be adopted to jointly indicate the system information association information.

In operation S102, system information is processed according to the system information association information.

After obtaining the system information association information, the network side device may know, based on the system information association information, whether the currently received SSB indicates the existence of the system information relevant information, so that UE may determine how to process the system information in the system information.

Specifically, a process in which the UE processes the system information according to the system information association information may include following operations S1021 to S1022.

In operation S1021, in response to that the system information association information represents that the carrier on which the SSB is located has the association relationship with the system information, the system information is received.

In operation S1022, in response to that the system information association information represents that the carrier on which the SSB is located has no association relationship with the system information, the system information is not received through a received current SSB.

In the embodiment of the disclosure, the system information association information includes: the carrier on which the SSB is located is the SA carrier or the carrier on which the SSB is located is the NSA carrier. In other words, the system information association information obtained by the UE either indicates the carrier on which the SSB is located is the SA carrier or indicates the carrier on which the SSB is located is the NSA carrier. When the unlicensed frequency spectrum is used, no relevant information representing the system information exists in the SSB transmitted in the NSA scenario, whereas the relevant information representing the system information exists only in the SA scenario. In other words, when the system information association information corresponds to the NSA carrier, the system information association information indicates that the carrier on which the SSB is located has no association relationship with the system information, and then UE does not receive the system information through the received current SSB. When the system information association information corresponds to the SA carrier, the system information association information indicates that the carrier on which the SSB is located has the association relationship with the system information, and then the UE receives and processes the system information.

It can be understood that as to the UE in the SA scenario using the unlicensed frequency spectrum, the SSB transmitted through the network side device is used to indicate whether the SSB belongs to the SA carrier or the NSA carrier. In this way, the UE may determine whether to continue to receive the system information or an SSB associated with the system information through the above information indicated by the SSB, and the UE is prevented from searching for the system information or the system information when the carrier on which the SSB is located is the NSA carrier, thus it becomes less complicated and less electricity-consuming for the UE to receive the system information. In other words, the UE receives the system information association information, since the system information association information indicates whether the carrier on which the SSB is located has the association relationship with the system information, the UE may determine a manner of processing the system information according to the system information association information representing whether the carrier on which the currently received SSB is located is associated with the system information. In this way, the UE is prevented from receiving or searching for the system information when the carrier on which the SSB is located has no association relationship with the system information. Therefore, the electricity used by the UE is reduced, information transmission and interaction is simplified, and thus UE's access efficiency in an accessing process is improved.

Second Embodiment

Based on a same inventive concept as that in the above embodiment, embodiments of the disclosure provide a method for information transmission. The method is applied to a network side device and may include operations S201 and S202.

In operation S201, system information association information is transmitted to UE, the system information association information representing whether a carrier on which an SSB is located has an association relationship with system information.

In the embodiment of the disclosure, the network side device may know whether an SA scenario or an NSA scenario is currently adopted. Therefore, the network side device may know whether an SA system transmits the SSB on a current carrier (that is to say, a carrier on which the SSB is located is an SA carrier) or an NSA system transmits the SSB on the current carrier (that is to say, the carrier on which the SSB is located is an NSA carrier) and may inform the UE of the scenario for the carrier on which the SSB. Since the carrier on which the SSB is located has the association relationship with the system information in the SA scenario and has no association relationship with the system information in the NSA scenario, the network side device may use the system information association information to indicate whether the carrier on which the SSB is located has the association relationship with the system information and transmits the system information association information to the UE, so that the UE may process the system information according to the system information association information.

Figure 4:
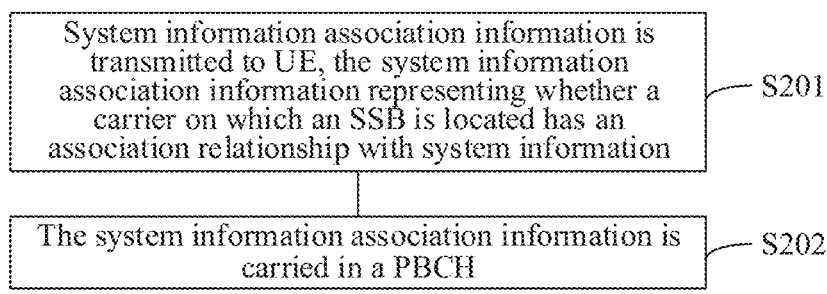
FIG. 4 is a schematic flowchart of another method for information transmission provided in an embodiment of the disclosure.

In some embodiments of the disclosure, as illustrated in FIG. 4, the method for information transmission provided in the embodiment of the disclosure may include following operation S202 before operation S201.

In operation S202, the system information association information is carried in a PBCH.

In the embodiment of the disclosure, the network side device may transmit a first SSB (a current SSB) carrying the PBCH to UE. The network side device adopts the PBCH to carry the system information association information so as to transmit the system information association information to the UE.

In a possible implementation mode of the embodiment of the disclosure, the network side device may determine a PDCCH resource information field corresponding to RMSI carried by the PBCH as the system information association information.

In another possible implementation mode of the embodiment of the disclosure, the network side device may determine a reserved value in a PRB grid offset information field carried by the PBCH as the system information association information.

Preferably, the reserved value in the PRB grid offset information field is 14 or 30, which may not be limited in the embodiment of the disclosure.

It should be noted that a detailed process in which the network side device implements the carrying of the system information is elaborated in the first embodiment and will not be repeated herein.

Figure 5:
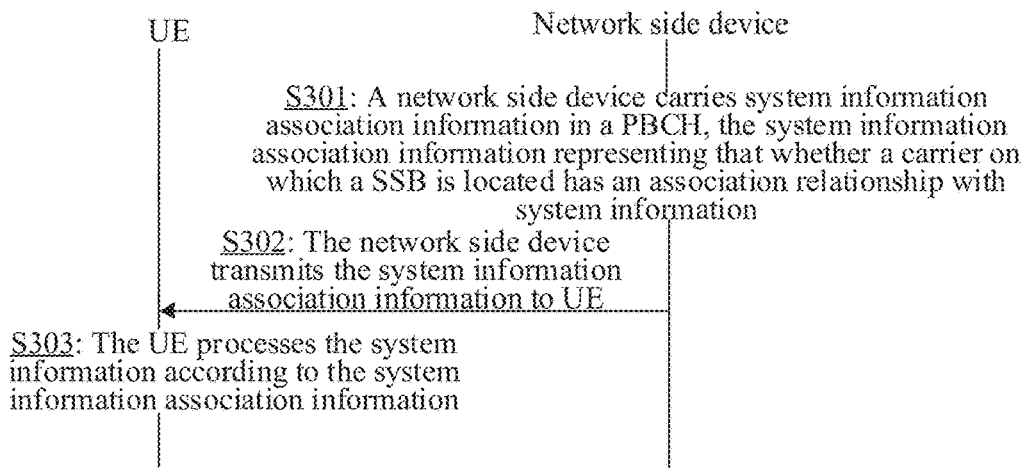
FIG. 5 is an interaction diagram of a method for information transmission provided in an embodiment of the disclosure.

Furthermore, based on a same inventive concept as that in the first embodiment and the second embodiment, embodiments of the disclosure provide a method for information transmission. As illustrated in FIG. 5, the method may include operations S301 to S303.

In operation S301, a network side device carries system information association information in a PBCH, the system information association information representing that whether a carrier on which an SSB is located has an association relationship with system information.

In operation S302, the network side device transmits the system information association information to UE.

In operation S303, the UE processes system information according to the system information association information.

Herein, a detailed implementation process of operations S301 to S303 is described in detailed in the preceding embodiments and will not be repeated herein.

It can be understood that the network side device may carry the system information association information through the PBCH. Since the system information association information indicates whether the carrier on which the SSB is located has the association relationship with the system information, when receiving the system information association information from the network side device, the UE may decide a manner adopted in processing system information according to the system information association information representing whether the carrier on which the currently received SSB is located is associated with the system information. In this way, the UE is prevented from receiving or searching for the system information in response to that the carrier on which the SSB is located does not have the association relationship with the system information, which reduces the electricity consumed by the UE, simplifies the information transmission and interaction and thus improves the UE's access frequency in an accessing process.

Third Embodiment

Figure 6:
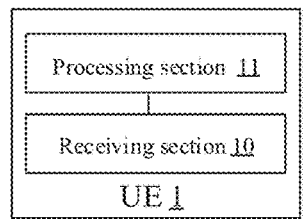
FIG. 6 is a schematic diagram of a composition of UE provided in an embodiment of the disclosure.

Based on a same inventive concept as that in the above embodiments, as illustrated in FIG. 6, embodiments of the disclosure provide UE 1. The UE 1 corresponding to the method for information transmission at a UE side may include a receiving section 10 and a processing section 11.

The receiving section 10 is configured to receive system information association information, the system information association information representing whether a carrier on which an SSB is located has an association relationship with system information.

The processing section 11 is configured to process the system information according to the system information association information.

In some embodiments of the disclosure, the system information association information is carried by a PBCH.

In some embodiments of the disclosure, the system information association information is carried through a PDCCH resource information field corresponding to RMSI carried by the PBCH.

In some embodiments of the disclosure, the system information association information is carried through a reserved value in a PRB grid offset information field carried by the PBCH.

In some embodiments of the disclosure, the system information association information includes: the carrier on which the SSB is located is an SA carrier or the carrier on which the SSB is located is an NSA carrier.

In some embodiments of the disclosure, the reserved value in the PRB grid offset information field is 14 or 30.

In some embodiments of the disclosure, the processing section 11 is specifically configured to, in response to that the system information association information indicates that the carrier on which the SSB is located has the association relationship with the system information, receive the system information.

In some embodiments of the disclosure, the processing section 11 is specifically configured to, in response to that the system information association information indicates that the carrier on which the SSB is located has no association relationship with the system information, not receive the system information through a received current SSB.

It can be understood that in the embodiment of the disclosure, the word "section" refers to a section of a circuit, a section of a processor, a section of a computer program, a section of software, a unit, a module, a non-module or the like and is not limited in the embodiment of the disclosure.

In practical applications, the above processing section 11 may be implemented by a first processor 12 and may be specifically a Central Processing Unit (CPU), a Microprocessor Unit (MPU), a Digital Signal Processor (DSP) a Field Programmable Gate Array (FPGA) or the like. The receiving section 10 may be implemented by a first network interface 13 and is not limited in the embodiment of the disclosure. The UE 1 further includes a first memory 14. The first memory 14 and the first network interface 13 may communicate with the first processor 12.

Figure 7:
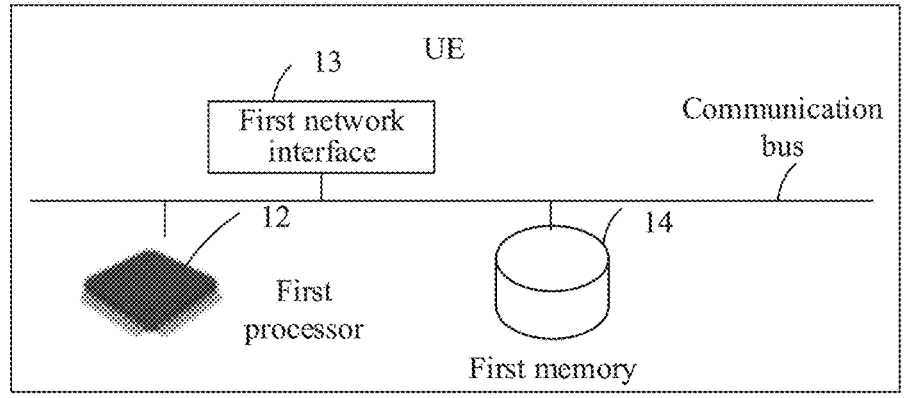
FIG. 7 is a schematic diagram of a specific hardware structure of UE provided in an embodiment of the disclosure.

Therefore, as illustrated in FIG. 7, UE is further provided in the embodiment of the disclosure and includes:

a first network interface 13, a first memory 14 and a first processor 12.

The first network interface 13 is configured to receive and transmit a signal and information during a process of transmitting information to and receiving information from another external network element.

The first memory 14 is configured to store computer programs executable by the first processor 12.

The first processor 12 is configured to execute operations of the UE's method for information transmission when the computer programs are executed.

It should be noted that in the practical applications all components in the UE are coupled together through a communication bus. It can be understood that the communication bus is configured to implement connections and communications among these components. Beside a data bus, the communication bus further includes a power bus, a control bus and a state signal bus. However, each of the buses may be referred to as the communication bus for the sake of clarity in descriptions.

In addition, each component part in the embodiment of the disclosure may be integrated in a processing unit, each unit may also exist physically and separately, and two or more than two units may also be integrated into a unit. The above integrated unit can be implemented in a form of hardware or a form of a software function module.

The integrated unit can be stored in a computer-readable storage medium if implemented in a form of the software function module and sold or used as a separate product. Based on such an understanding, an essential part of the technical solutions in the embodiment of the disclosure, a part of the technical solutions in the embodiment of the disclosure making contributions to the prior art, all or a part of the technical solutions may be embodied in a form of a software product. The computer software product is stored in a storage medium and includes several instructions configured to enable a computer device (which may be a personal computer, a server, a network device or the like) or a processor to execute all or a part of the operations of the method in the embodiment of the disclosure. The above-mentioned storage medium includes: various media capable of storing program codes such as a Ferromagnetic Random Access Memory (FRAM), a Read-Only Memory (ROM), a Programmable Read-Only Memory (PROM), an Erasable Programmable Read-Only Memory (EPROM), an Electrically Erasable Programmable Read-Only Memory (EEPROM), a flash memory, a magnetic surface memory, an optical disk, a Compact Disc Read-Only Memory (CD-ROM) and is not limited in the embodiment of the disclosure.

Embodiments of the disclosure provide a computer-readable storage medium having stored thereon programs for information transmission that, when executed by at least one first processor, cause operations of the UE's method for information transmission to be performed.

It can be understood that the UE receives system information association information. Since the system information association information indicates whether the carrier on which the SSB is located has the association relationship with the system information, the UE may decide a manner adopted in processing the system information according to the system information association information representing whether the carrier on which the currently received SSB is located is associated with the system information. In that way, the UE is prevented from receiving or searching for the system information in response to that the carrier on which the SSB is located does not have the association relationship with the system information, which reduces the electricity consumed by the UE, simplifies the information transmission and interaction and thus improves the UE's access frequency in an accessing process.

Fourth Embodiment

Figure 8:
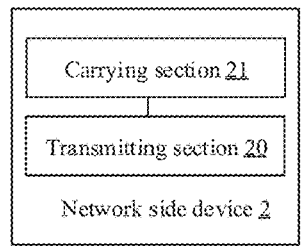
FIG. 8 is a schematic diagram of a composition of a network side device provided in an embodiment of the disclosure.

Based on a same inventive concept as that in the above embodiments, as illustrated in FIG. 8, a network side device 2 is provided in the embodiment of the disclosure. The network side device 2 corresponds to a network side device's method for information transmission and may include a transmitting section 20.

The transmitting section 20 is configured to transmit system information association information to UE, the system information association information representing whether a carrier on which an SSB is located has an association relationship with system information.

In some embodiments of the disclosure, the network side device 2 further includes a carrying section 21.

The carrying section 21 is configured to carry the system information association information in a PBCH before the system information association information used for representing the SSB is transmitted to the UE.

In some embodiments of the disclosure, the carrying section 21 is specifically configured to determine a PDCCH resource information field corresponding to RMSI carried by the PBCH as the system information association information.

In some embodiments of the disclosure, the carrying section 21 is specifically configured to determine a reserved value in a PRB grid offset information field carried by the PBCH as the system information association information.

In some embodiments of the disclosure, the reserved value in the PRB grid offset information field is 14 or 30.

It can be understood that in the embodiment of the disclosure, the word "section" refers to a section of a circuit, a section of a processor, a section of a computer program, a section of software, a unit, a module, a non-module or the like and is not limited in the embodiment of the disclosure.

In practical applications, the above carrying section 21 may be implemented by a second processor 22 on the network side device 2 and may be specifically a CPU, an MPU, a DSP, an FPGA or the like. The transmitting section 20 may be implemented by a second network interface 23, which is not limited in the embodiment of the disclosure. The network side device 2 may include a second memory 24. The second memory 24 and the second network interface 23 may communicate with the second processor 22.

Figure 9:
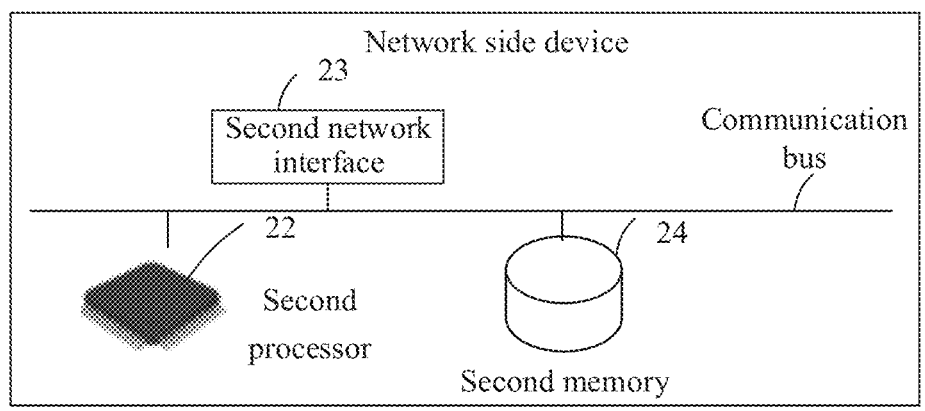
FIG. 9 is a schematic diagram of a specific hardware structure of a network side device provided in an embodiment of the disclosure.

Therefore, as illustrated in FIG. 9, the network side device is further provided in the embodiment of the disclosure and includes the second network interface 23, the second memory 24 and the second processor 22.

The second network interface 23 is configured to receive and transmit a signal and information during a process of transmitting information to and receiving information from another external network element.

The second memory 24 is configured to store computer programs executable by the second processor 22.

The second processor 22 is configured to execute operations of the network side device's method for information transmission when the computer programs are executed.

It should be noted that in the practical applications all components in the network side device are coupled together through a communication bus. It can be understood that the communication bus is configured to implement connections and communications among these components. Beside a data bus, the communication bus further includes a power bus, a control bus and a state signal bus. However, each of the buses may be referred to as the communication bus for the sake of clarity in descriptions.

Similar to the UE, A computer software product in the network side device may be stored in a storage medium, the reason of which is not elaborated herein.

Provided in the embodiments of the disclosure is a computer-readable storage medium having stored thereon programs for information transmission that, when executed by at least one second processor, cause operations of the network side device's method for information transmission to be performed.

It can be understood that the network side device may carry the system information association information through the PBCH. Since the system information association information indicates whether the carrier on which the SSB is located has the association relationship with the system information, when receiving the system information association information from the network side device, the UE may decide a manner adopted in processing the system information according to the system information association information representing whether the carrier on which the currently received SSB is located is associated with the system information. In that way, the UE is prevented from receiving or searching for the system information in response to that the carrier on which the SSB is located does not have the association relationship with the system information, which reduces the electricity consumed by the UE, simplifies the information transmission and interaction and thus improves the UE's access frequency in an accessing process.

Those described above are just preferred embodiments of the present disclosure, and are not intended to limit the scope of the invention.

INDUSTRIAL APPLICABILITY

The UE receives system information association information. Since the system information association information indicates whether the carrier on which the SSB is located has the association relationship with the system information, the UE may decide a manner adopted in processing the system information according to the system information association information representing whether the carrier on which the SSB is located is associated with the system information. In that way, the UE is prevented from receiving or searching for the system information in response to that the carrier on which the currently received SSB is located does not have the association relationship with the system information, which reduces the electricity consumed by the UE, simplifies the information transmission and interaction and thus improves the UE's access frequency in an accessing process.

The invention claimed is:

1. A method for information transmission, applied to User Equipment (UE), the method comprising:
receiving system information association information, the system information association information representing whether a carrier on which a Synchronization Signal Block (SSB) is located has an association relationship with system information; and
processing the system information according to the system information association information.

2. The method of claim 1, wherein the system information association information is carried by a Physical Broadcast Channel (PBCH).

3. The method of claim 2, wherein the system information association information is carried through a Physical Downlink Control Channel (PDCCH) resource information field corresponding to Remaining Minimum System Information (RMSI) carried by the PBCH.

4. The method of claim 2, wherein the system information association information is carried through a reserved value in a Physical Resource Block (PRB) grid offset information field carried by the PBCH.

5. The method of claim 1, wherein the system information association information comprises: the carrier on which the SSB is located is a Standalone (SA) carrier or the carrier on which the SSB is located is a Non-Standalone (NSA) carrier.

6. A method for information transmission, applied to a network side device, the method comprising:
transmitting system information association information to User Equipment (UE), the system information association information representing whether a carrier on which a Synchronization Signal Block (SSB) is located has an association relationship with system information.

7. The method of claim 6, further comprising: before transmitting the system information association information used for representing the SSB to the UE,
carrying the system information association information in a Physical Broadcast Channel (PBCH).

8. The method of claim 7, wherein the system information association information is carried through a Physical Downlink Control Channel (PDCCH) resource information field corresponding to Remaining Minimum System Information (RMSI) carried by the PBCH.

9. The method of claim 7, wherein a reserved value in a Physical Resource Block (PRB) grid offset information field carried by the PBCH is determined as the system information association information.

10. The method of claim 6, wherein the system information association information comprises: the carrier on which the SSB is located is a Standalone (SA) carrier or the carrier on which the SSB is located is a Non-Standalone (NSA) carrier.

11. User Equipment (UE), comprising a first network interface, a first memory and a first processor, wherein the first network interface is configured to receive and transmit a signal and information during a process of receiving information from and transmitting information to another external network element;
the first memory is configured to store computer programs executable by the first processor; and
the first processor is configured to execute operations of a method for information transmission when the computer programs are executed, the method comprising:
receiving system information association information, the system information association information representing whether a carrier on which a Synchronization Signal Block (SSB) is located has an association relationship with system information; and
processing the system information according to the system information association information.

12. The UE of claim 11, wherein the system information association information is carried by a Physical Broadcast Channel (PBCH).

13. The UE of claim 12, wherein the system information association information is carried through a Physical Downlink Control Channel (PDCCH) resource information field corresponding to Remaining Minimum System Information (RMSI) carried by the PBCH.

14. The UE of claim 12, wherein the system information association information is carried through a reserved value in a Physical Resource Block (PRB) grid offset information field carried by the PBCH.

15. The UE of claim 11, wherein the system information association information comprises: the carrier on which the SSB is located is a Standalone (SA) carrier or the carrier on which the SSB is located is a Non-Standalone (NSA) carrier.

16. A network side device, comprising a second network interface, a second memory and a second processor, wherein the second network interface is configured to receive and transmit a signal and information during a process of receiving information from and transmitting information to another external network element;

the second memory is configured to store computer programs executable by the second processor; and the second processor is configured to execute operations of a method for information transmission when the computer programs are executed, the method comprising:

transmitting system information association information to User Equipment (UE), the system information association information representing whether a carrier on which a Synchronization Signal Block (SSB) is located has an association relationship with system information.

17. The network side device of claim 16, wherein the method further comprises: before transmitting the system information association information used for representing the SSB to the UE, carrying the system information association information in a Physical Broadcast Channel (PBCH).

18. The network side device of claim 17, wherein the system information association information is carried through a Physical Downlink Control Channel (PDCCH) resource information field corresponding to Remaining Minimum System Information (RMSI) carried by the PBCH.

19. The network side device of claim 17, wherein a reserved value in a Physical Resource Block (PRB) grid offset information field carried by the PBCH is determined as the system information association information.

20. The network side device of claim 16, wherein the system information association information comprises: the carrier on which the SSB is located is a Standalone (SA) carrier or the carrier on which the SSB is located is a Non-Standalone (NSA) carrier.

* * * * *